United States Patent [19]
Boileau

[11] 3,858,633
[45] Jan. 7, 1975

[54] HEAVY-DUTY RADIAL TIRE FOR USE ON AND OFF THE ROAD

[75] Inventor: Jacques Boileau, Clermont-Ferrand, France

[73] Assignee: Compagnie Generale des Establissements Michelin, raison sociale Michelin & Cie, Clermont-Ferrand (Puy-de-Dome), France

[22] Filed: Nov. 1, 1972

[21] Appl. No.: 302,930

[30] Foreign Application Priority Data
Nov. 8, 1971 France .............................. 71.40040

[52] U.S. Cl. ...................... 152/209 R, 152/209 D
[51] Int. Cl. ............................................. B60c 11/06
[58] Field of Search ............. 152/209 R, 209 D, 210

[56] References Cited
UNITED STATES PATENTS

| 3,586,086 | 6/1971 | Boileau | 152/209 |
| 3,645,314 | 2/1972 | Verdier | 152/209 |
| 3,675,700 | 7/1972 | Verdier | 152/209 |

FOREIGN PATENTS OR APPLICATIONS

| 1,089,326 | 12/1953 | France | 152/209 |
| 845,013 | 7/1949 | Germany | 152/209 |

Primary Examiner—Robert G. Sheridan
Assistant Examiner—Kenneth Noland
Attorney, Agent, or Firm—Brumbaugh, Graves, Donohue & Raymond

[57] ABSTRACT

A radial tire for heavy-duty vehicles comprises a tread having a central portion and two lateral portions. The central portion is formed with at least one circumferential rib and at least two circumferential grooves, and each lateral portion is formed with a circumferential zigzag rib and with transverse grooves and blocks. The circumferential zigzag rib defines angles that are alternately reentrant and salient, and the transverse grooves and blocks form extensions, in a direction towards the nearer edge of the tread, of the reentrant and salient angles, respectively. Successive transverse blocks alternately terminate at greater and lesser distances from the median plane of the tire, and each transverse groove has less-steeply-inclined walls than the circumferential grooves have and have at every level a greater width than the circumferential grooves have at the same level.

8 Claims, 3 Drawing Figures

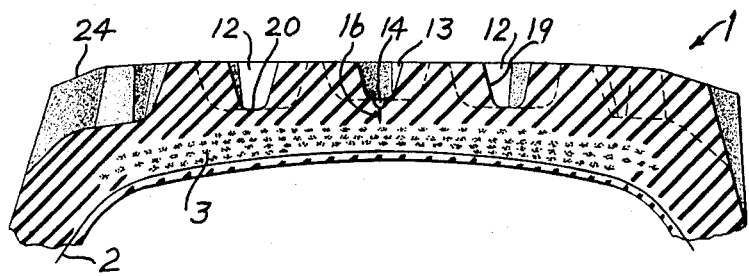
FIG. 1
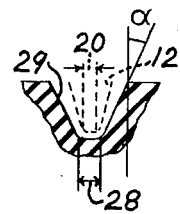
FIG. 3
FIG. 2
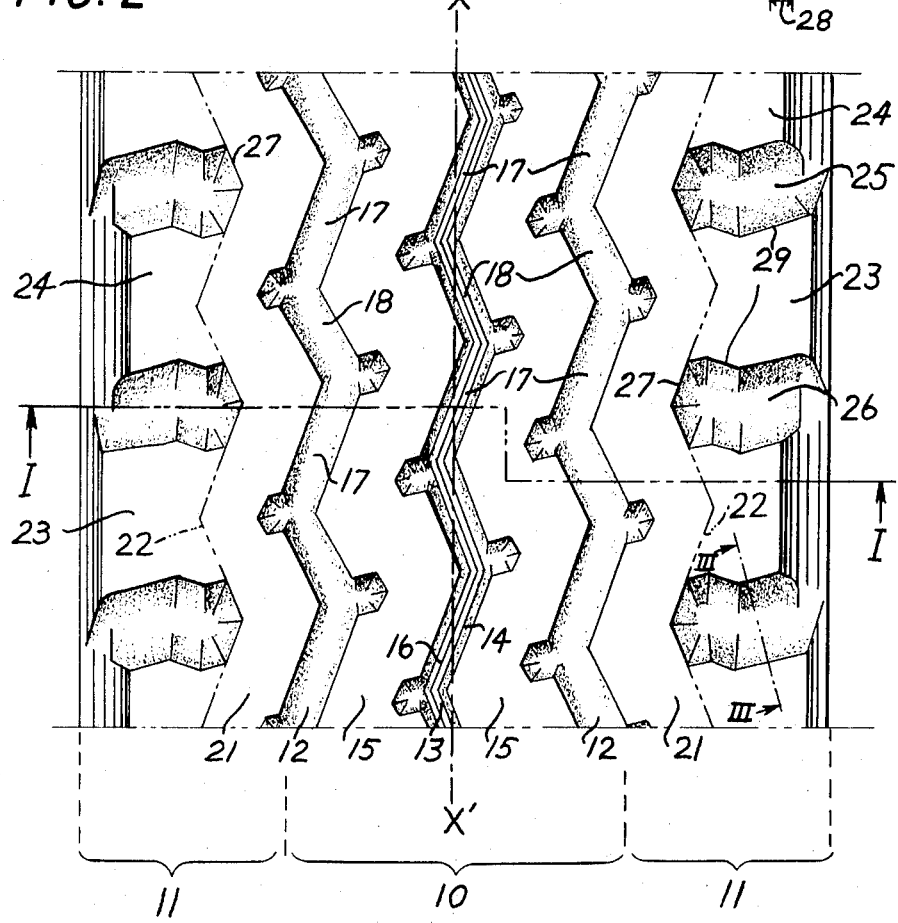

HEAVY-DUTY RADIAL TIRE FOR USE ON AND OFF THE ROAD

BACKGROUND OF THE INVENTION

This invention relates to radial-carcass tires for heavy vehicles (trucks, buses, etc.) and, more particularly, to the design of the tread of tires intended for vehicles that are to travel both on paved roads and on rough land.

The treads of radial-type tires for trucks and other vehicles that travel both on roads and on soft ground are subject to contradictory requirements.

For travel on roads or highways, it is necessary, in order to avoid excessive wear of the lateral portions of the tread, to impart as great a tread density (i.e., ratio of area of relief elements to area of recessed portions) as possible to these portions: proportionally, the area of the elements in relief must be at least as large there as in the central portion, and preferably larger. For this reason it has been proposed (French patent No. 1,452,048) to place the circumferential zigzag grooves of ordinary width that form the main element of the sculpturing of the tread closer to the central plane than to the edges of the tread in the case of tires of the radial type for heavy vehicles.

On the other hand, for travel on soft ground, it is advisable, in order to obtain acceptable adherence, to form large grooves in the side portions of the tread. Generally, transverse grooves are provided that connect one of the edges of the tread to the closest circumferential groove, and the latter are arranged close to the edge of the tread.

In the case of large grooves formed in the lateral portions of the tread, the adherence on loose earth is improved, but greater wear results on roads; and, in the case of small grooves formed in the lateral portions of the tread, less wear results on roads, but the adherence on loose earth is not so good.

SUMMARY OF THE INVENTION

An object of the invention is to solve the problems of prior tires outlined above by providing a tire having a tread so designed that the tire, as compared with conventional tires, has either increased resistance to tread wear when traveling on paved roads or increased adherence to soft earth. More particularly, an object of the invention is to make it possible to obtain both good adherence to soft earths and good resistance to wear on highways by imparting to the side portions of the tread both the high tread density necessary to resist wear on the highway and the rugged contour necessary to provide traction on rough land.

The foregoing and other objects are attained in accordance with the invention by providing a tire whose tread has a central portion formed of at least one circumferential rib and at least two zigzag circumferential grooves, as well as two lateral or side portions, each having transverse grooves and blocks. The tire is characterized in that in each side portion the transverse grooves and blocks form extensions, in the direction towards one edge of the tread, of the reentrant and salient, angles, respectively, of a continuous zigzag circumferential rib, each transverse block terminating at a distance from the central plane that is either greater or less than that between the two adjacent transverse blocks and the central plane, and each transverse groove having at any level a greater width and less-steeply-inclined walls than the circumferential grooves.

In the preferred embodiments:

a. the total area of the elements in relief in the two lateral portions (each lateral portion being formed of a circumferential zigzag rib extended laterally by transverse blocks) is greater than the total area of the elements in relief in the central portion;

b. the transverse blocks in the circumferential direction and in the transverse direction have dimensions that are substantially greater than the width of the rib or ribs forming the central portion of the tread;

c. the difference between the distance to the central plane from the most protruding transverse blocks and the distance to the central plane from the least protruding transverse blocks is equal to approximately half the width of the circumferential rib or ribs forming the central portion of the tread;

d. the radially outer surface of the transverse blocks has an angular meridian profile;

e. the transverse grooves have an angular course and perimeter;

f. the transverse grooves have a depth greater than that of the circumferential grooves;

g. the inclination of the common walls of the transverse blocks and grooves with respect to the normal to the tread surface is between 20° and 30°.

The invention has substantial advantages. By imparting to the transverse blocks in the transverse direction the support of the salient angles of a zigzag circumferential rib and in the circumferential direction the support of walls whose inclination with respect to the tread surface is not too steep, the resistance to wear of the lateral zones of the tread is increased. Moreover, by widely spacing the transverse blocks by means of wide, deep grooves that commence at the reentrant angles of a zigzag circumferential rib and by varying the dimension of the blocks in the transverse direction, the contour of the engaging teeth that these transverse blocks constitute is made more rugged.

It is advisable to design the central portion of the tread in such a manner as to impart to it good characteristics of adherence and resistance to wear on highways by employing any suitable arrangement. The walls of the ribs are preferably given a variable inclination. It is also advantageous to extend any circumferential groove by a cut close to the median plane. The central portion can be formed of two identical circumferential ribs and three circumferential grooves, one of the central grooves being possibly of the same width or narrower than the other two and extended in the direction of the axis by a narrow cut.

BRIEF DESCRIPTION OF THE DRAWING

An understanding of other aspects of the invention can be gained from a consideration of the following detailed description of the preferred embodiments thereof, in conjunction with the appended figures of the drawing, wherein:

FIG. 1 is a fragmentary view in radial section, taken along the line I—I of FIG. 2 and looking in the direction of the arrows, of a tire having a tread in accordance with the invention;

FIG. 2 is a plan view of a sector of the tread of the tire; and

FIG. 3 is a view in section, taken along the line III—III of FIG. 2 and looking in the direction of the arrows, and showing in dotted outline the cross-section of a longitudinal groove of the tread for purposes of comparison.

DESCRIPTION OF THE PREFERRED EMBODIMENTS

FIGS. 1 and 2 show the tread 1 of a tire of size 12.00–20, as well as the underlying reinforcement comprising a carcass 2 of radially arranged cords and a tread reinforcement 3 comprising a plurality of plies of cords.

As FIG. 2 shows, the tread comprises a central portion 10 and two side portions 11 symmetrical with respect to the central plane X–X'. The central portion 10 comprises two lateral grooves 12, a central groove 13, and two circumferential zigzag ribs 15. The central groove 13 is narrower than the side grooves 12; near its bottom it has a restriction 14 designed to prevent the retention of stones, and it is extended by a fine cut 16 that facilitates the transverse flexing and pivoting of the tread near the central plane. The three grooves have a zigzag course comprising a succession of long segments 17 and short segments 18; their walls 19 have an inclination (with respect to the normal to the tread surface) that varies between 0° and about 20°, the bottom 20 being flat. The inclination with respect to the tread surface is of course the complement of the inclination with respect to the normal to the tread surface.

The relief elements of each of the two side portions 11 comprise a circumferential rib 21 similar to the circumferential ribs 15 but extending along salient angles 22 (shown in dot-dash line) via transverse blocks 23 or 24. The blocks 23 extend laterally a greater distance from the central plane X–X' than do the blocks 24, each block 23 (or 24) being included between two shorter (or longer) adjacent blocks 24 (or 23). The recessed parts of the side portions 11 comprise transverse grooves 25 or 26 having an angular course and perimeter and forming an extension of the reentrant angles 27 of the ribs 21. FIG. 3 shows that the transverse grooves 25 or 26 have a bottom of a width 28 greater than the width 20 of the bottom of the grooves 12. The walls 29 of these grooves 25 and 26 are formed of faces inclined with respect to the normal to the tread surface by an angle $\alpha$ of 27°. The walls 29 of the transverse grooves are thus less steeply inclined with respect to the tread surface than are the walls of the longitudinal grooves. Furthermore, it can be noted from FIG. 3 that the depth of the transverse grooves is greater than the depth of the longitudinal groove 12, shown in dotted line.

The assembly comprising the ribs 21 and the blocks 23 and 24 forming the lateral portions 11 has an area that is definitely greater than that of the assembly of ribs 15 forming the central portion 10. The transverse blocks 23 and 24 have a dense tread structure with dimensions in the transverse and circumferential directions that are greater than the width of the ribs 15. Moreover, the transverse blocks 23 and 24 have transverse dimensions that differ from each other by an amount approximately equal to one-half of the width of the ribs 15.

As FIG. 1 shows, the meridian profile of the blocks 23 and 24 is angular and is formed of portions with different inclinations to the axis of the tire. Moreover, the transverse grooves 25 and 26 have a greater depth than the depth of the circumferential grooves 12 or 13, since one disregards, in connection with the latter, the cut 16 which forms an extension of it in the direction of the axis.

The tread shown in FIGS. 1 to 3 combines in its side portions both a high tread density and a rugged contour. The result is a resistance to wear on the highway and an adherence to soft earth which has been unequaled up to now in a tire designed for combined use. These dense and rugged lateral portions are furthermore combined with a conventional central portion that provides good resistance to wear and good adherence, particularly on highways.

Thus there is provided in accordance with the invention a novel and highly-effective heavy-duty radial tire for use on and off the road. Many modifications of the representative embodiment disclosed above will readily occur to those skilled in the art. For example, other designs of the tread in the central portion 10 can be employed. Accordingly, the invention is to be construed as including all the embodiments thereof within the scope of the appended claims.

I claim:

1. A radial tire for heavy-duty vehicles comprising a tread having a central portion and two lateral portions, the central portion being formed with at least one circumferential rib and at least two circumferential grooves, the circumferential rib having a wall in common with each circumferential groove, and each lateral portion being formed with a substantially continuous circumferential zigzag rib and with alternating transverse grooves and blocks, each of said substantially continuous circumferential zigzag ribs defining angles that are alternately reentrant and salient, the transverse grooves forming extensions, in a direction towards the nearer edge of the tread, of the reentrant angles of the substantially continuous circumferential zigzag rib, the transverse blocks (a) forming extensions, in a direction towards the nearer edge of the tread, of the salient angles of the substantially continuous circumferential zigzag rib, (b) being contiguous with the substantially continuous circumferential zigzag, (c) alternately terminating at greater and lesser distances from the median plane of the tire, and (d) having a wall in common with the adjacent transverse grooves, the common walls of the transverse grooves and blocks having an inclination with respect to the normal to the tread surface that is greater than are the inclinations with respect to the normal to the tread surface of the common walls of the circumferential rib and circumferential grooves, the transverse grooves having at every level a greater width than the circumferential grooves have at the same level the total area of the substantially continuous circumferential zigzag ribs and blocks exceeding the total area of the circumferential rib or ribs in the central portion, the blocks having, in the circumferential and transverse directions, dimensions that exceed the width of the circumferential rib or ribs in the central portion, the transverse grooves having an angular course and perimeter, and the common walls of the transverse grooves and blocks having an inclination of 20° to 30° with respect to the normal to the tread surface.

2. A radial tire according to claim 1 wherein the total area of the substantially continuous circumferential zigzag ribs and blocks exceeds the total area of the circumferential rib or ribs in the central portion.

3. A radial tire according to claim 1 wherein the blocks have, in the circumferential and transverse directions, dimensions that exceed the width of the circumferential rib or ribs in the central portion.

4. A radial tire according to claim 1 wherein the difference between said distances is substantially equal to half the width of the circumferential rib or ribs in the central portion.

5. A radial tire according to claim 1 wherein the radially outer surface of the transverse blocks has an angular meridian profile.

6. A radial tire according to claim 1 wherein the transverse grooves have an angular course and perimeter.

7. A radial tire according to claim 1 wherein the transverse grooves have a depth greater than that of the circumferential grooves.

8. A radial tire according to claim 1 wherein the common walls of the transverse grooves and blocks have an inclination of 20° to 30° with respect to the normal to the tread surface.

* * * * *

PO-1050
(5/69)

UNITED STATES PATENT OFFICE
CERTIFICATE OF CORRECTION

Patent No. 3,858,633    Dated January 7, 1975

Inventor(s) Jacques Boileau

It is certified that error appears in the above-identified patent and that said Letters Patent are hereby corrected as shown below:

On the Cover Page, after [73] Assignee, "Establissements" should be --Etablissements--; Col. 1, lines 62 and 63, after "salient" delete comma (,); and Col. 4, line 41, after "zigzag" insert --rib--.

Signed and sealed this 4th day of March 1975.

(SEAL)
Attest:

RUTH C. MASON
Attesting Officer

C. MARSHALL DANN
Commissioner of Patents
and Trademarks